United States Patent

[11] 3,592,481

| [72] | Inventors | Warren C. Jeffery;<br>Sidney P. Teague, both of Birmingham, Ala. |
|---|---|---|
| [21] | Appl. No. | 726,287 |
| [22] | Filed | May 3, 1968 |
| [45] | Patented | July 13, 1971 |
| [73] | Assignee | McWane Cast Iron Pipe Co.<br>Birmingham, Ala.<br>Continuation-in-part of application Ser. No. 529,776, Feb. 24, 1966, now abandoned. |

[54] PIPE COUPLING
5 Claims, 3 Drawing Figs.

[52] U.S. Cl.............................................. 277/207, 285/230
[51] Int. Cl.............................................. F16j 15/00, F16k 41/00
[50] Field of Search.......................................... 277/168, 207, 170; 285/231, 230

[56] References Cited
UNITED STATES PATENTS
2,146,641 2/1939 McWane.................... 277/207 AUX
3,317,214 5/1967 Durgom...................... 277/170
FOREIGN PATENTS
583,760 10/1958 Italy............................. 285/110

*Primary Examiner*—Samuel Rothberg
*Attorney*—Diller, Brown, Ramik & Holt

ABSTRACT: This disclosure relates to bell and spigot pipe joints wherein the bell includes an annular recess in which is positioned an elastomeric sealing member. The sealing member in transverse cross section includes a generally rectangular base portion received in the recess and a generally apex portion projecting radially outwardly beyond an inner surface of the bell. The ratio of the width of the base portion to the maximum depth of the sealing member is approximately between 1.75 to 3.0 while the ratio of the width of the base portion to the depth of the base portion is approximately 10 to 1.

PATENTED JUL 13 1971 3,592,481

INVENTORS
WARREN C. JEFFERY &
SIDNEY P. TEAGUE

BY
Mason, Porter, Diller & Brown
ATTORNEYS 3,592,481

PIPE COUPLING

This application constitutes a continuation-in-part application of Ser. No. 529,776, and now abandoned entitled PIPE COUPLING, filed Feb. 24, 1966

Pipe joints of the bell and spigot type are known in the art and are characterized by the provision of an annular elastomeric gasket or sealing member which is seated in an annular groove or recess in the bell end of a pipe. The elastomeric sealing member is compressed by the insertion of the spigot end of a like section of pipe into the bell section, so as to cause the sealing member to tightly engage the groove or recess in the bell end of the pipe and to flatten the sealing member against the spigot end of the inserted pipe. In this manner considerable surface area engagement is provided by the sealing member with the spigot end of the pipe.

Though pipe joints constructed in accordance with the foregoing description have achieved a high degree of acceptance, difficulties are known to have been encountered in providing a simple, economical and efficient joint for bell and spigot pipe members which is capable of withstanding substantially high internal pressures, is easy to assemble, and will remain stable and provide a positive seal when in use.

Accordingly, it is a primary object of this invention to provide a novel pipe joint which includes a bell having an inner annular recess opening radially inwardly through an inner surface of the bell, the annular recess being defined by front and rear peripheral end walls and a circumferential wall therebetween, an elastomeric sealing member seated in the recess, the elastomeric member in transverse cross section including a generally rectangular base portion received in the recess and a generally triangular apex portion projecting radially outwardly beyond the inner surface. The ratio of the width of the base portion to the maximum depth of the sealing member is approximately between 2.00 to 2.75, while the ratio of the width of the base portion to the depth of the base portion is approximately 10 to 1.

The invention both as to its organization and method of operation together with further objects and advantages thereof will be best understood by reference to the following specification taken in conjunction with the accompanying drawing in which.

Figure 1:
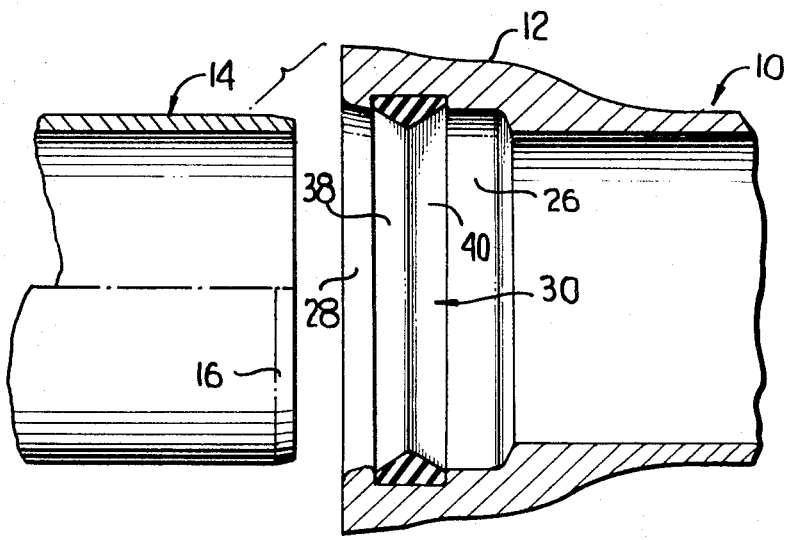
FIG. 1 is an exploded perspective view partly in cross section of the spigot and bell prior to assembly with the sealing member being illustrated in its noncompressed condition seated partially within the inner annular recess of the bell.

With reference to FIG. 1 of the drawing, a pipe member is shown wherein a spigot 10 includes an integral bell 12. A second pipe member is illustrated wherein only a spigot 14 thereof is visible. The spigot 14 is formed at its leading edge with a tapered surface 16 for facilitating the assembly of the pipe joint or coupling.

The bell 12 (FIG. 2) includes an internal annular recess or cavity 18 defined by a front end peripheral wall 20, a rear end peripheral wall 22 and a circumferential wall or surface 24 which is inboard of and generally coaxial to an inner surface 26 of the bell 12. The bell 12 further includes a tapered leading edge surface 28 which facilitates the subsequent assembly of the spigot 14 within the bell 12.

Figure 2:
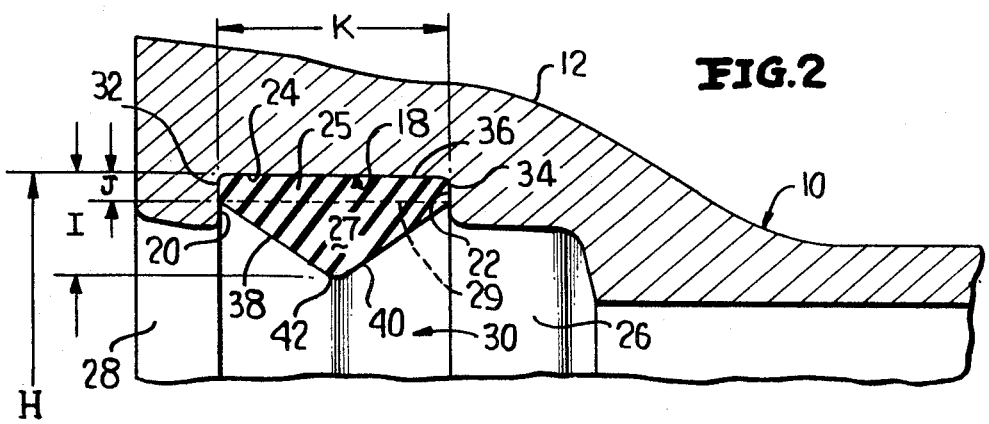
FIG. 2 is an enlarged fragmentary sectional view of the bell of FIG. 1, and more clearly illustrates the position of the sealing member in the annular recess prior to the introduction of the spigot therein.

The configuration of an elastomeric sealing member 30 in its uncompressed condition is best illustrated in FIG. 2 and in cross section includes a generally rectangular base portion 25 and a generally triangular apex portion 27 set off by a common imaginary surface 29. The sealing member 30 includes a front end peripheral surface 32 and a rear end peripheral surface 34 joined by a circumferential surface 36. A pair of tapered surfaces 38 and 40 of the apex portion 27 extend from the surfaces 32, 34, respectively, to form a "V" converging at a rounded apex 42. Thus, it is evident that when in position, the elastomeric sealing member 30 is so positioned that the front end wall 20 of the recess 18 engages a front end surface 32 of the sealing member 30; the circumferential surface 24 of the recess 18 engages the circumferential surface 36 of the sealing member 30, and the rear end wall 22 of the recess 18 engages the rear end surface 34 of the sealing member 30.

In the uncompressed condition of the sealing member 30, as best illustrated in FIG. 2, it should be noted that the base portion 25 is housed entirely within the recess 18 while a portion of the apex portion 28 projects beyond the inner surface 26. This positioning of the sealing member is conjunction with the particular configuration thereof assures that the sealing member will not roll or unseat when the pipe joint is assembled and provides an efficient seal under both minimum and maximum pipe joint tolerances under the severest of conditions. Since the gasket is particularly adapted for use with "as-cast" ductile iron pipes manufactured with wide manufacturing tolerances and no machining the gasket must and does provide adequate compression for the loosest fit, namely, one embodying the largest bell tolerance and the smallest spigot tolerance.

CHART I

| Size: | Joint (FIGURE 3) | | | | | | |
|---|---|---|---|---|---|---|---|
| | A | B | C | D | E | F | G |
| 2 | 2.50 | 2.50 | 2.60 | 3.20 | 2.69 | .37 | 1.18 |
| 2¼ | 2.75 | 2.50 | 2.85 | 3.45 | 2.94 | .37 | 1.18 |
| 3 | 3.96 | 3.00 | 4.07 | 4.76 | 4.16 | .45 | 1.35 |
| 4 | 4.80 | 3.15 | 4.91 | 5.66 | 5.04 | .48 | 1.46 |
| 6 | 6.90 | 3.38 | 7.01 | 7.80 | 7.14 | .61 | 1.53 |
| 8 | 9.05 | 3.69 | 9.17 | 10.07 | 9.32 | .67 | 1.74 |
| 10 | 11.10 | 3.75 | 11.22 | 12.16 | 11.37 | .73 | 1.83 |
| 12 | 13.20 | 3.75 | 13.32 | 14.32 | 13.47 | .73 | 1.94 |
| 14 | 15.30 | 5.00 | 15.44 | 16.70 | 15.64 | .84 | 2.40 |
| 16 | 17.40 | 5.00 | 17.54 | 18.86 | 17.74 | .84 | 2.50 |

CHART II

| Size: | Gasket (FIGURE 2) | | | | | | |
|---|---|---|---|---|---|---|---|
| | H | I | J | K | K/J | K/I | L |
| 2 | 3.30 | .47 | .11 | 1.15 | 10.45 | 2.45 | 1.19 |
| 2¼ | 3.55 | .47 | .11 | 1.15 | 10.45 | 2.45 | 1.19 |
| 3 | 4.86 | .54 | .12 | 1.32 | 11.00 | 2.44 | 1.21 |
| 4 | 5.76 | .59 | .13 | 1.43 | 11.00 | 2.42 | 1.23 |
| 6 | 7.90 | .62 | .14 | 1.50 | 10.71 | 2.42 | 1.24 |
| 8 | 10.19 | .71 | .16 | 1.71 | 10.69 | 2.41 | 1.26 |
| 10 | 12.28 | .75 | .17 | 1.80 | 10.59 | 2.40 | 1.28 |
| 12 | 14.44 | .80 | .18 | 1.91 | 10.61 | 2.39 | 1.30 |
| 14 | 16.86 | 1.00 | .22 | 2.37 | 10.77 | 2.37 | 1.31 |
| 16 | 19.02 | 1.04 | .23 | 2.47 | 10.74 | 2.38 | 1.32 |

Reference is now made to charts I and II which indicate in more specifics the particular configurations and relationship of the bell, spigot and gasket which conjunctively achieve the objects of this invention.

Chart I in column 1 indicates pipe sizes 2 through 16 and reading from left to right indicates in columns A through G the outside diameter of the spigot, the total bell depth, the maximum throat clearance, the gasket seat diameter, the inner surface diameter, the throat length, and the gasket seat of the annular recess, respectively.

Chart II likewise represents in columns H through L the maximum gasket outside gasket diameter, the maximum gasket depth, the base portion height, the gasket width, the ratio of gasket width to base portion height, the ratio of gasket width to gasket thickness, and the minimum compression, respectively.

It has been found that two factors in particular are significant in assuring that the pipe joint can be readily assembled without any gasket rolling and yet effecting a desired seal under extremely high internal hydraulic pressure. These two factors are represented by columns $K_{/J}$ and $K_{/I}$ which represent the range of gasket width to gasket base portion depth, and gasket width to overall gasket thickness or height. The ratio of gasket width to gasket thickness ($K_1$) is between 2.37 to 2.45, and though this is a critical ideal range a ratio between slightly above 1.75 to 3.00 would function as intended although on the high side of the range the economy of manufacturing the gasket might prove prohibitive.

Figure 3:
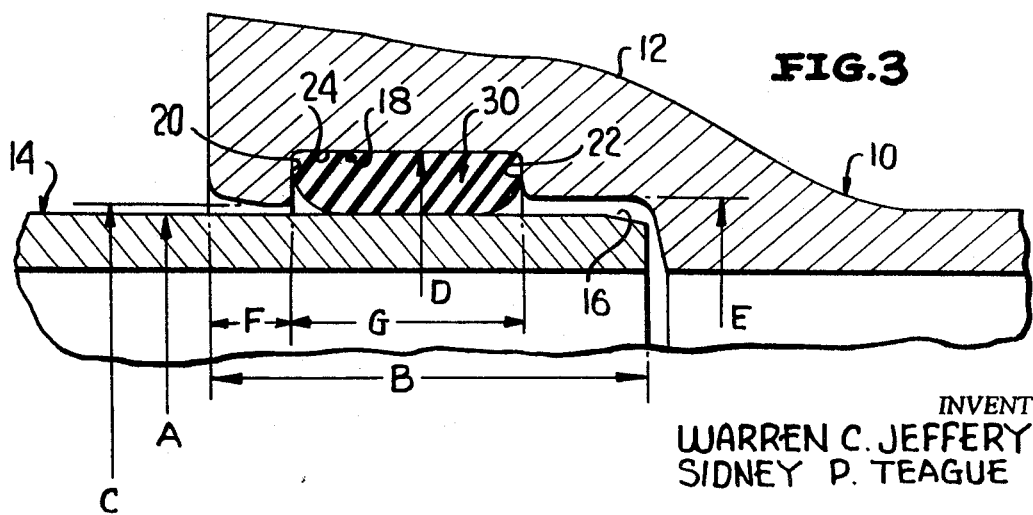
FIG. 3 is a fragmentary sectional view of the bell and spigot in the assembled condition thereof, and illustrates the compressed condition of the sealing member.

The approximate 10 to 1 ratio of the gasket width to the height of the gasket base portion permits an ample seating surface of the gasket within the annular recess yet assures that sufficient space remains into which the compressed material of the gasket can flow when in the compressed condition of FIG. 3. The gasket preferably has a durometer hardness of 60 but may range between 50 to 70 and the looseness tolerance of joint results in a compression of the gasket between 19 to 32 percent.

In further accordance with this invention the total volume of each gasket is no greater than and slightly less than the total volume of the gasket volume which is defined by the area set out between the walls 20, 22 and 24 of the annular recess 18 and the outside diameter A of the particular bell and spigot involved. As an example, the cross-sectional area of the gasket space for the 12-inch pipe is 0.9645 square inch which is determined by multiplying the axial length of the surface 24 (1.91 inches) and the radial distance (0.505) between the outside diameter of the spigot and the circumferential gasket seat 24 of the annular recess.

The area of the 12-inch gasket can likewise be readily calculated and is approximately 0.8996 square inch, thus representing a ratio in areas (and volumes) between the gasket space and the gasket material approaching 1 to 1. However, the 1 to 1 ratio is never achieved and in all cases the area and volume of the gasket is less than that of the minimum gasket area and volume available.

While preferred forms and arrangements of parts have been shown in illustrating the invention, it is to be clearly understood that various changes in details and arrangement of parts may be made without departing from the spirit and scope of the invention as defined in the appended claimed subject matter.

We claim:

1. A pipe bell comprising a tubular member having an inner annular recess opening radially inwardly through an inner surface of said member, said annular recess being defined by a front peripheral end wall and a rear peripheral end wall joined by a circumferential wall, an elastomeric sealing member seated in said recess, said elastomeric sealing member in transverse cross section including a generally rectangular base portion received in said recess and a generally triangular apex portion projecting radially outwardly beyond said inner surface, and the ratio of the width of said base portion to the maximum depth of said sealing member being approximately between 1.75 to 3.00.

2. The pipe bell as defined in claim 1 wherein the ratio of the width of said base portion to the maximum depth of said sealing member is approximately 2.00 to 2.75.

3. The pipe bell as defined in claim 1 wherein the ratio of the width of the base portion to the depth of the base portion is approximately 10 to 1.

4. The pipe bell as defined in claim 2 wherein the ratio of the width of the base portion to the depth of the base portion is approximately 10 to 1.

5. A pipe bell comprising a tubular member having an inner annular recess opening radially inwardly through an inner surface of said member, said annular recess being defined by a front peripheral end wall and a rear peripheral end wall joined by a circumferential wall, an elastomeric sealing member seated in said recess, said elastomeric member in transverse cross section includes a generally rectangular base portion received in said recess and a generally triangular apex portion projecting radially outwardly beyond said inner surface, and the ratio of the width of the base portion to the depth of the base portion being approximately 10 to 1.